United States Patent [19]
Revilla et al.

[11] Patent Number: 5,623,636
[45] Date of Patent: Apr. 22, 1997

[54] DATA PROCESSING SYSTEM AND METHOD FOR PROVIDING MEMORY ACCESS PROTECTION USING TRANSPARENT TRANSLATION REGISTERS AND DEFAULT ATTRIBUTE BITS

[75] Inventors: Juan G. Revilla, Austin, Tex.; Art Parmet, Burlington, Mass.

[73] Assignee: Motorola Inc., Schaumburg, Ill.

[21] Appl. No.: 149,496

[22] Filed: Nov. 9, 1993

[51] Int. Cl.$^6$ .............................. G06F 12/08; G06F 12/14
[52] U.S. Cl. ............................................. 395/490; 395/413
[58] Field of Search .................................... 395/490, 412, 395/419, 481, 413

[56] References Cited

U.S. PATENT DOCUMENTS 5,091,846  2/1992  Sachs et al. ............................. 395/250
5,321,836  6/1994  Craword et al. ........................ 395/416

FOREIGN PATENT DOCUMENTS 2248327  1/1992  United Kingdom ............ G06F 12/14
WO88/02148  3/1988  WIPO ............................. G06F 12/10

*Primary Examiner*—Jack A. Lane
*Attorney, Agent, or Firm*—Keith E. Witek

[57] ABSTRACT

A data processing system (10 or 28) and method uses a memory management unit (MMU 14). The processor has two privileged modes of operations, such as a user mode and a supervisor mode of operation. The MMU 14 has a first mode of operation wherein logical address translation is performed via cache accesses and tablewalks, and a second mode of operation. The second mode of operation involves providing translation attribute bits from one of either a first transparent translation register (TTR 16), a second transparent translation register (TTR 18), or a default location (22). The TTRs (16 and 18) can each map different address spaces and different addressed memory sizes and the default location (22) covers all memory that is not mapped by one of the TTRs (16 or 18). The default location (22) is programmable, provides write protection, and provides attribute bits independent from the privilege mode.

13 Claims, 3 Drawing Sheets

E = ENABLE
S = SUPERVISOR/USER FIELD
U = USER PAGE ATTRIBUTES (U1, U0)
CM = CACHE MODE
W = WRITE PROTECTION

DCO = DEFAULT DATA CACHE MODE
DUO = DEFAULT DATA USER PAGE ATTRIBUTES (U1, U0)
DWO = DEFAULT WRITE PROTECTION
DCI = DEFAULT INSTRUCTION CACHE MODE
DUI = DEFAULT INSTRUCTION USER PAGE ATTRIBUTES (U1, U0)

DATA PROCESSING SYSTEM AND METHOD FOR PROVIDING MEMORY ACCESS PROTECTION USING TRANSPARENT TRANSLATION REGISTERS AND DEFAULT ATTRIBUTE BITS

FIELD OF THE INVENTION

The present invention relates generally to data processors which access memory, and more particularly, memory management units having transparent address translation registers.

BACKGROUND OF THE INVENTION

In a memory management unit, to satisfy systems requiring the transparent mapping of several large areas of memory, it is sometimes necessary to provide memory access control over the remaining address space where the transparent translation registers do not map. This was accomplished in the past by a set of hardwired access control attribute bits stored within the memory management unit. This hardwired storage method has the one major disadvantage that it provides no flexibility, since the attribute bits are stored in a storage location fixed in the hardware and cannot be changed by a system user or programmer.

Some systems incorporated a privilege-mode dependent mode of operation for the MMU to provide access control over the unmapped space. Specifically, in the Identity Translation Mode, access control is regulated by a set of four area descriptors wherein a first descriptor is used to control supervisor space instruction accesses, a second descriptor is used to control supervisor space operand accesses, a third descriptor is used to control user space instruction accesses, and a fourth descriptor is used to control user space operand accesses. This method has a major disadvantage in that it requires the segmenting of the logical address space into supervisor and user spaces since, the supervisor area descriptors cannot protect the supervisor space from unauthorized accesses by user programs. Another major disadvantage this method presents is that it requires a multiple number of register to be configured by the programmer.

SUMMARY OF THE INVENTION

In one form, the present invention comprises a method for providing memory access control in a data processing system wherein the data processing system has at least two processor privilege modes of operation. A logical address is provided to a memory management unit within the data processor. A portion of the logical address is selectively compared to a predetermined number of bits within a first transparent translation register. A first control signal is asserted if the portion of the logical address is equal to the predetermined number of bits of the first transparent translation register. A portion of the logical address is selectively compared to a predetermined number of bits within a second transparent translation register. A second control signal is asserted if the portion of the logical address is equal to the predetermined number of bits of the second transparent translation register. Attribute bits from the first transparent translation register, attribute bits from the second transparent translation register, or attribute bits from a default storage location are selected based upon either the first control signal or the second control signal. The default storage location provides attribute bits regardless of processor privilege mode.

In another form, the invention comprises a data processor having a memory management unit with at least two modes of operation. One mode of operation being a normal mode of operation and a second mode of operation being a default mode of operation. The data processor having two privilege modes (user and supervisor modes, in one form) wherein the two privileged modes provide data protection. The data processor has circuitry for providing to the memory management unit a logical address. A first and second transparent translation register are functionally part of the memory management unit. Compare circuitry for receiving the logical address is located within the data processor. The compare circuitry is coupled to both the first transparent translation register and the second transparent translation register. The compare circuit compares a predetermined number of bits in the logical address to a predetermined number of bits in each of the first and second transparent translation register and asserts a control signal if the predetermined number of bits in the logical address equal the predetermined number of bits in one of the first and second transparent translation register. The compare circuitry functions in the default mode of operation. A default storage location within the memory management unit is used for storing a plurality of attribute bits. The default storage location has an output for providing the plurality of attribute bits regardless of the privilege mode. A selector circuit has a first input for receiving a predetermined number of attribute bits from the first transparent translation register, has a second input for receiving a predetermined number of attribute bits from the second transparent translation register, and has a third input coupled to the output for providing the plurality of attribute bits regardless of the privilege mode. The selector circuit is coupled to the control signal wherein the control signal is used to determine an output of the selector circuit wherein the output of the selector circuit is the bits of one of either the first input, the second input, or the third input. The selector circuit functions in the default mode of operation.

The present invention will be more clearly understood from the detailed description below in conjunction with the accompanying drawings.

Figure 1:
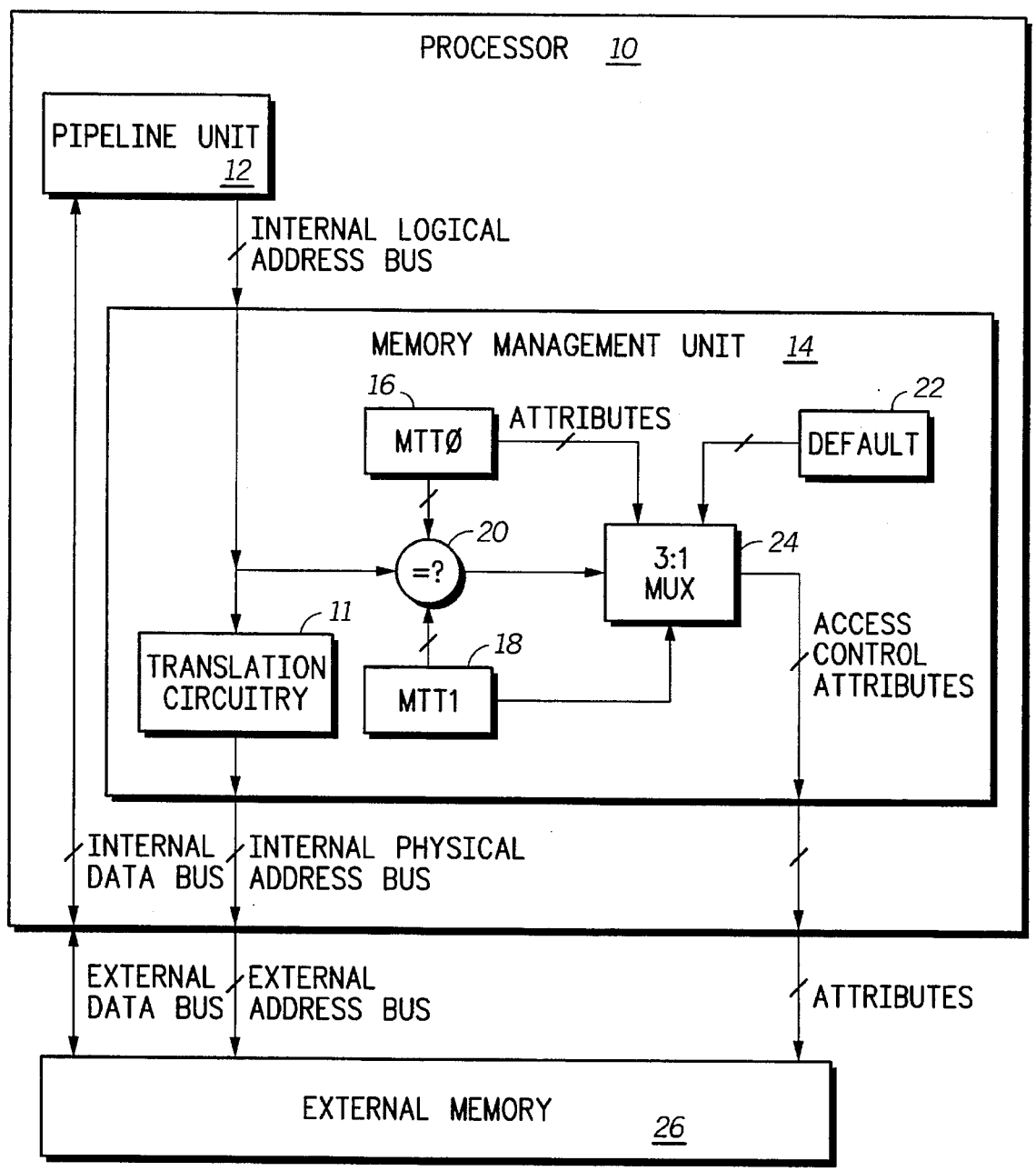
FIG. 1 illustrates, in a block diagram form, a data processing system in accordance with the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DESCRIPTION OF A PREFERRED EMBODIMENT

Generally, the present invention provides a method and an apparatus for providing memory access control within a data processor. This is accomplished by performing a default address mapping of a logical address to a physical address during a normal memory access. The method begins by providing a privilege mode (supervisor or user) and a logical address to a memory management unit (MMU). A determination as to whether or not the privilege mode and the logical address match either the privilege mode and a block of logical addresses defined by a first transparent translation register (TTR) or the privilege mode and the block of logical addresses defined by a second transparent translation register is performed. A transparent mapping of the logical address during the memory access is performed by the first TTR if the first TTR is matched. If the second TTR is matched, and the first TTR is not matched, the transparent mapping of the logical address is performed by the second TTR. However, if neither TTR is matched, a default address translation is invoked and a set of access control bits stored in a default access control register are used for the access.

The default access control register provides write protection via the storing of a write protection bit. The default access control register outputs attribute bits independent or without considering whether the user or supervisor mode is being utilized. Furthermore, the default access control register outputs attribute bits which may be altered or programmed by a system user or programmer.

The present invention can be more fully understood with reference to FIGS. 1–5. FIG. 1 illustrates a system having a processor 10. The processor 10 has a pipeline unit 12 and a memory management unit (MMU) 14. Unit 12 is used to execute instructions within the processor 10. Unit 12 operates in one of two levels of privilege: supervisor mode or user mode. In general, the processor 10 may either be or include a microprocessor, a pipelined execution device, an application specific integrated circuit (ASIC) device, a programmable logic array (PLA), hard-wired logic, an execution unit at least partially software driven by microcode and/or nanocode, a plurality of execution devices, a digital signal processor (DSP), a computer, a data processor, a central processing unit (CPU), a microcontroller unit (MCU) and/or the like.

The principal function of MMU 14, within the processor 10, is to translate logical addresses provided by unit 12 to physical addresses using the translation circuitry in a normal mode of operation. The translation circuitry 11 may require address translation cache (ATC) accesses and/or tablewalks to perform the address translation in the normal mode of operation. In a default mode of operation, the translation circuitry 11 provides the logical address as the physical address (i.e. logical address bits equal the physical address bits) and the bus attribute bits are derived via circuitry illustrated in FIG. 1.

As previously stated, the MMU 14 operates in one of two modes of operation: normal mode or default mode. The MMU 14 has a first transparent translation register (TTR) 16 and a second transparent translation register 18 which are used to define blocks of logical addresses to be used as physical addresses during normal memory accesses in the default or normal mode of operation. The TTRs are usually disabled during the normal mode of operation, in a preferred form, and therefore only used in a default mode of operation. The MMU 14 also has a page address translation unit which is used to translate logical addresses to physical addresses, which is illustrated in FIG. 1 via the circuitry 11.

The units 12 and 14 are connected to an external memory 26 via an external address bus. A bi-directional data bus is connected between the external memory 26 and the pipeline unit 12 as illustrated in FIG. 1. In many cases, the address bus and data bus go through logic such as input drivers, output driver I/O drivers, bus control circuitry, cache units, and the like which are not illustrated in FIG. 1 for simplicity. Unit 14 is also connected to the external memory 26 via a plurality of attribute signals. The pipeline unit 12 receives data from the memory 26 and the unit 14 provides address and access control information to the memory 26.

The pipeline unit 12 determines that an access to memory 26 is required. An internal logical address is provided to the MMU 14 as illustrated. The MMU 14 first compares the privilege mode and the logical address, via a comparator unit 20, to the privilege mode and a block of logical addresses defined by TTR 16 and to the privilege mode and the block of logical addresses defined by TTR 18. In a preferred form, unit 20 is a parallel compare unit, although many serial compare units exist in the art and may be used with TTR 16 and TTR 18. If either TTR 16 or TTR 18 is matched via the comparator unit 20, the logical address is used as a physical address for the memory access. In addition, a multiplexer (MUX) 24 which is controlled by the output of the comparator unit 20, passes the set of access control attribute bits stored in the matched TTR (either TTR 16 or TTR 18) to the memory 26 via a plurality of attribute data lines.

If neither TTR 16 or 18 is matched, and MMU 14 is operating in the normal mode, the page address translation unit 11 is invoked to perform a physical address translation of the logical address and the output of the MUX 24 is ignored for the memory access. If neither TTR is matched, and the MMU 14 is operating in the default mode, the set of access control bits stored in a programmer visible default access control register 22 is used for the access.

Once the physical address and the set of access control attributes has been received by the external memory 26, the external memory 26 provides a plurality of data bits to the pipeline unit 12 via the data bus in response to the external physical address.

In a preferred form, the set of access control attribute bits stored in TTR 16, TTR 18, and the default access control register (default storage) 22 comprise a set of cache mode bits, a set of user page attribute bits, and a data write access protection bit. It is important to note that if the default access control register 22 did not exist, and the MMU 14 is operating in the default mode, flexible access control could not be provided over the unmapped space in the event of a TTR miss (i.e. no address hit in either TTR 16 or TTR 18). It is also important to note that if the default access control register 22 did not exist, and the MMU 14 is operating in the default mode, data write access protection could not be provided over the unmapped space in the event of a TTR miss.

Figure 2:
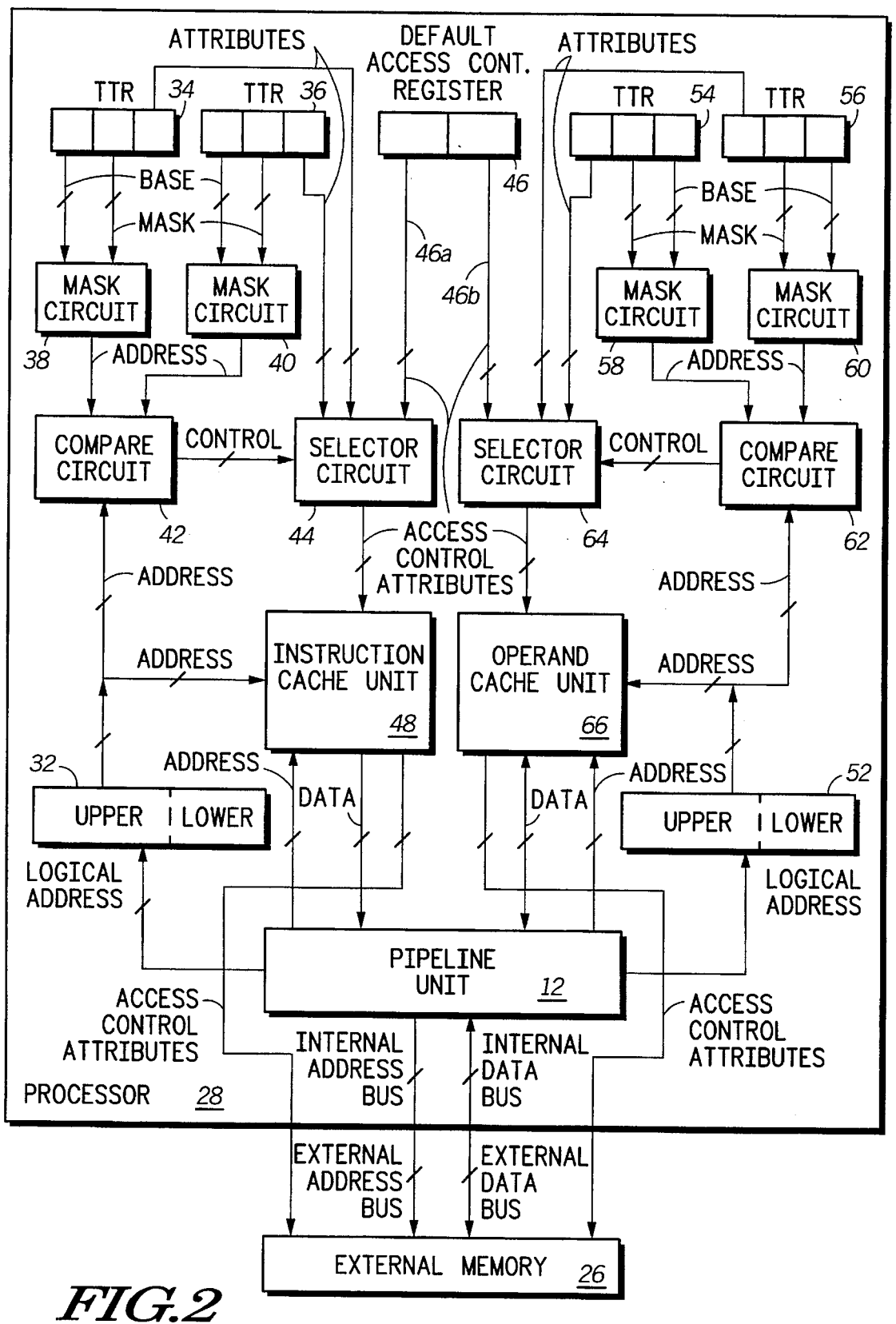
FIG. 2 illustrates, in a block diagram form, another data processing system in accordance with the present invention.

FIG. 2 illustrates another data processing system having a processor 28 which is connected to an external memory 26 via a plurality of address and data lines. The processor 28 has a pipeline unit 12 and two independent memory cache units: an instruction cache unit (ICU) 48 and an operand data cache unit (OCU) 66. Unit 12 is used to execute instructions within the processor 28 and operates in one of two levels of privilege: supervisor mode or user mode. The ICU 48 and the OCU 66 are connected to unit 12 via a plurality of address and data lines. The ICU 48 is used to retain copies of recently prefetched instruction data for quick access by the pipeline unit 12. The OCU 66 is used to retain copies of recently fetched operand data for quick access by the pipeline unit 12. Data stored in the ICU 48 and the OCU 66 can be provided to unit 12, simultaneously, and faster than it can be provided by the external memory 26. Therefore, ICU 48 and OCU 66 are used for the purpose of throughput improvement of instruction data and operand data accesses.

Processor 28 also has a first transparent translation register (TTR) 34 and a second transparent translation register 36 which are used to define blocks of logical addresses to be used as physical addresses during the prefetching of instruction data, and a third transparent translation register 54 and a fourth transparent translation register 56 which are used to define blocks of logical addresses to be used as physical addresses during operand data accesses. In a preferred form, each TTR 34, 36, 54, and 56 comprises a logical address base field, a logical address mask field, a privilege mode bit, and a plurality of access control attribute bits which include a set of cache mode bits, a set of user page attribute bits, and a data write access protection bit.

The pipeline unit 12 determines that an instruction data access and/or an operand data access to the ICU 48 and/or the OCU 58 is required. If an instruction data access is required, a logical address 32 (divided into upper and lower bit portions) is provided to the ICU 48 and a comparator circuit 42. The logical address 32 is divided into an upper portion and a lower portion as illustrated. The comparator circuit 42 is used to compare the privilege mode and the upper portion of the logical address to the privilege mode bit and the logical address base bits stored in TTR 34 and to the privilege mode bit and the logical address base bits stored in TTR 36. A mask circuit 38 uses the logical address mask bits stored in TTR 34 to determine which bits of the logical address base field of TTR 34 are ignored during the comparison. If a logical address mask bit in TTR 34 is set, the corresponding logical address base bit in TTR 34 is ignored during the comparison. In a similar manner, the mask circuit 40 uses the logical address mask bits stored in TTR 36 to determine which bits of the logical address base field of TTR 36 are ignored during the comparison. If either TTR 34 or TTR 36 is matched a selector circuit 44, which is controlled by the output of the comparator circuit 42, passes the set of access control attribute bits stored in the matched TTR to the ICU 48 via a plurality of data lines. If neither TTR is matched, the selector circuit 44 passes the set of access control bits 46a stored in a programmer visible default access control register 46 to the ICU 48. Using the logical address as a physical address, the ICU 48 searches for cache data within its memory banks in response to the physical address. If found, the ICU 48 supplies the data to the pipeline unit 12 via a plurality of data lines. If the data is not found within the ICU 48, the ICU 48 requests an external memory access and passes the access control attribute bits to the external memory 26 via a plurality of data lines.

If an operand data access is required, a logical address 52 is provided to the OCU 66 and the comparator circuit 62. The logical address 52 is divided into a similar manner to the logical address 32. The comparator circuit 62 is used to compare the privilege mode and the upper portion of the logical address to the privilege mode bit and the logical address base bits stored in TTR 54 and to the privilege mode bit and the logical address base bits stored in TTR 56. A mask circuit 58 uses the logical address mask bits stored in TTR 54 to determine which bits of the logical address base field of TTR 54 are ignored during the comparison. If a logical address mask bit in TTR 54 is set, the corresponding logical address base bit in TTR 54 is ignored during the comparison. In a similar manner, the mask circuit 60 uses the logical address mask bits stored in TTR 56 to determine which bits of the logical address base field of TTR 56 are ignored during the comparison. If either TTR 54 or TTR 56 is matched a selector circuit 64, which is controlled by the output of the comparator circuit 62, passes the set of access control attribute bits stored in the matched TTR to the OCU 66 via a plurality of data lines. If neither TTR is matched, the selector circuit 64 passes a set of access control bits 46b stored in the programmer visible default access control register 46 to the OCU 66. Using the logical address as a physical address, the OCU 66 searches for cache data within its memory banks in response to the physical address. If found, the OCU 66 supplies the data to the pipeline unit 12 via a plurality of data lines. If the data is not found within the OCU 66, the OCU 66 requests an external memory access and passes the access control attribute bits to the external memory 26 via a plurality of data lines.

Once the physical address and the set of access control attributes has been received by the external memory 26, the external memory 26 provides a plurality of data bits to the unit 12 via a data bus in response to the physical address.

It is important to note again that if the default access control register 46 did not exist, flexible access control and/or write access protection could not be provided over the unmapped space in the event of a TTR miss. It is also important to note that a single default access control register can provide memory access control in a system with independent instruction and operand memory cache units. The default access control register 46 contains a write protection bit, is accessed independent of the user or supervisor mode, and is programmable and therefore very flexible.

Figure 3:
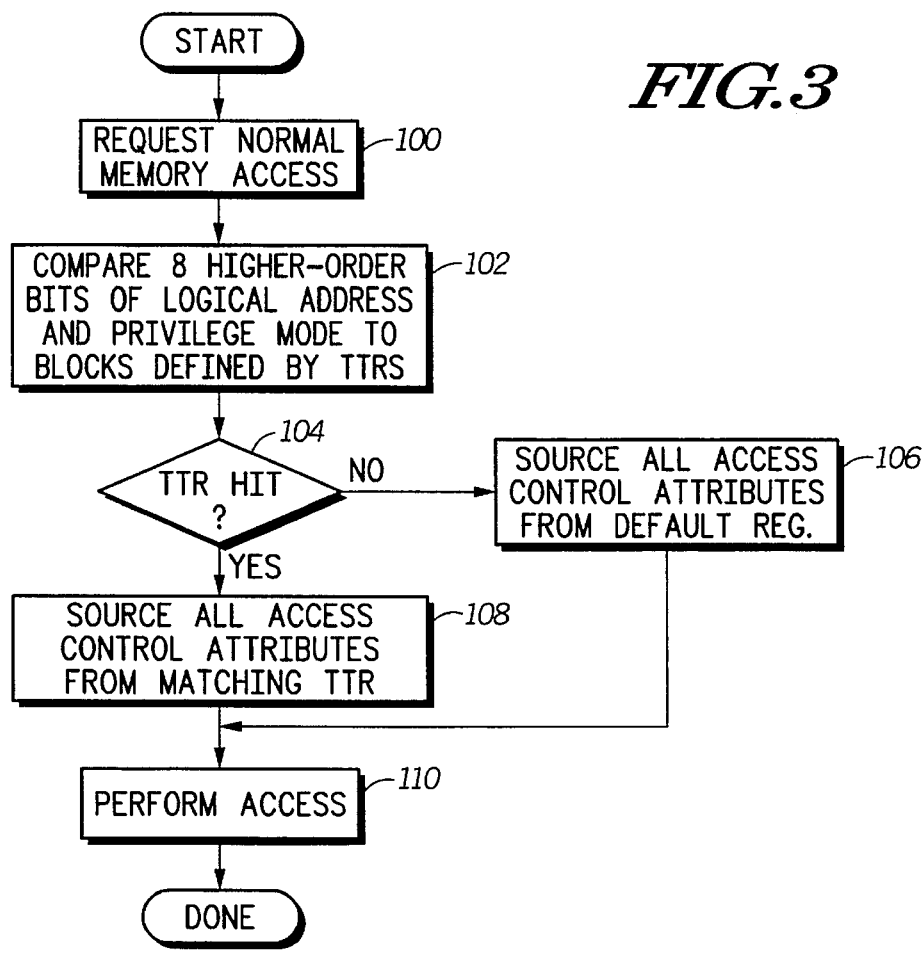
FIG. 3 illustrates, in a flow chart, a method for providing memory access control in accordance with the present invention.

FIG. 3 illustrates a flowchart which describes a method used by the processors 10 and/or 28 to provide memory access control. A step 100 indicates that the pipeline unit 12 is processing an instruction in one of two privilege modes (supervisor or user), needs to perform a normal memory access, and provides a logical address to the MMU 14 and/or the comparator circuits 42 and 62. A step 102 indicates that the privilege mode and the upper portion of the logical address (see logical addresses 32 and 52 of FIG. 2) are compared, via the compare unit 20 or compare units 42 and 62, to the privilege modes and the blocks of logical address defined by the TTRs 16 and 18 or TTRs 34, 36, 54, and 56. A step 104 indicates that the MUX 24 or the selector circuits 44 and 64 determine, based on the results from the comparisons performed in step 102, which set of access control attribute bits should be used for the access. Step 104 also implies that the MMU 14 is operating in the default mode. If a TTR miss is detected in step 104, then a step 106 is performed. In step 106, the MUX 24 selects a set of access control attribute bits stored in a default access control register 22. If a TTR hit is detected in step 104, in a step 108 the MUX 24 selects the set of access control attribute bits stored in the matching TTR for the access. In a step 110, the MUX 24 supplies the selected attributes to an external memory 26 and the memory access is completed.

Figure 4:
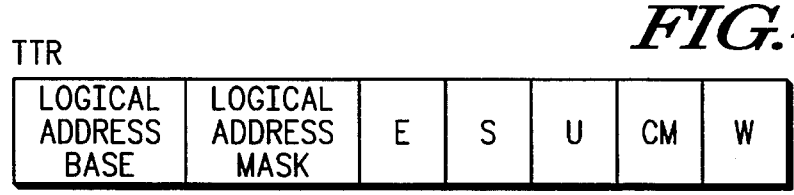
FIG. 4 illustrates, in a block diagram form, a bit configuration of a transparent translation register (TTR) in accordance with the present invention.

FIG. 4 illustrated a preferred bit format used in FIGS. 1–3 for the TTRs 16, 18, 34, 36, 54, and 56. FIG. 4 illustrates a transparent translation register (TTR) (preferably having 32 bits) which has several bit fields and bit values described below:

LOGICAL ADDRESS BASE: This 8-bit field is compared with the eight higher-order bits of the logical address during the privilege mode and logical address comparison and is utilized in the MMU default mode of operation.

LOGICAL ADDRESS MASK: This 8-bit field is used as a mask for the logical address base field. When a bit in this field is set, the corresponding bit in the logical address base field is ignored during the privilege mode and logical address comparison.

E—ENABLE: This bit enables and/or disables the TTR register. A disabled TTR is completely ignored during the privilege mode and logical address comparison in the MMU default mode.

S—SUPERVISOR/USER MODE: This field specifies the privilege mode to be matched during the privilege mode and logical address comparison.

U—USER PAGE ATTRIBUTES U1, U0: These bits are not interpreted by the processor 10 and/or 28 but are echoed to a UPA1 pin and a UPA0 pin on the processor 10 and/or 28 during a normal memory access, respectively. The UPA1 may be used as a chip select in some designs.

CM—CACHE MODE: This 2-bit field is used to select the cache mode for a normal memory access. The CM field allows for four states wherein one state is a cacheable writethrough state, a second state is a cacheable copyback state, a third state is a cache inhibited state, precise exception model, and a fourth state is a cache inhibited state, imprecise exception model.

W—WRITE PROTECT: This bit indicates if a memory address space is write protected. If set, write and read-modify-write accesses are not permitted to all addresses within the protected address space.

Figure 5:
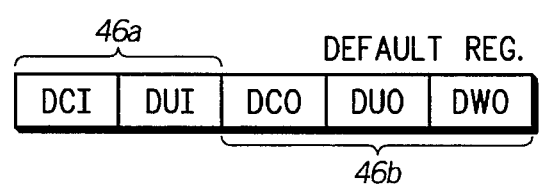
FIG. 5 illustrates, in a block diagram form, a bit configuration of a default attribute storage register in accordance with the present invention.

FIG. 5 illustrates a preferred bit format used in FIGS. 1–3 for the default bit portions 44a and 44b in FIG. 2. These bits are described below:

DCO—DEFAULT OPERAND CACHE MODE: This 2bit field functions in a similar manner to the CM field of the TTR of FIG. 4.

DUO—DEFAULT OPERAND User Page Attributes: This 2-bit field functions in a similar manner to the U1 and U0 bits in the TTR of FIG. 4.

DCI—DEFAULT INSTRUCTION CACHE MODE: This 2-bit field functions in a similar manner to the DCO field.

DUI—DEFAULT INSTRUCTION User Page Attributes: This 2-bit field functions in a similar manner to the DUO field.

W—WRITE PROTECT: This bit functions in a similar manner to the W bit in the TTR of FIG. 4.

The present invention provides a method and apparatus for providing memory access control in a data processing system. With such a method and apparatus, the flexible default address mapping of a logical address to a physical address can be provided.

The invention described here may be compared to other known and documented methods of providing a default address mapping of a logical address to a physical address. With these other methods, the default access control attributes bits are stored in separate registers wherein one register is used for user accesses only and the other register is used for supervisor accesses only.

The problem with this method is that it requires the segmenting of the logical address space into supervisor and user spaces, since otherwise, the supervisor space cannot be protected from unauthorized accesses by user programs. The invention solves this problem by disregarding the privilege mode in providing the default address mapping for a given memory access. Therefore, the integrated circuit used less substrate surface area and speed is improved. In addition, to protect the supervisor space from unauthorized user program accesses that may result in the corruption of data, optional write access protection is also provided.

While the present invention had been shown and described with reference to specific embodiments, further modifications and improvements will occur to those skilled in the art. For example, a variety of MMU's, for which the present invention may provide a default address mapping capability, exist in the art wherein the MMU may contain any number of the following: a page address translation cache (ATC), a block address translation cache, a transparent translation register or any other type of address translation facility. Bus bit sizes may vary depending on design constraints. In addition the bit fields and control signals described herein may be either a single bit or a plurality of bits. Zero, one, or more caches may be used in a system. Many different methods of encoding and decoding logical addresses exist in the art and all may be used herein as a logical address. It is understood, therefore, that this invention is not limited to the particular forms shown and that it is intended in the appended claims to cover all modifications that do not depart from the spirit and scope of this invention.

We claim:

1. A data processor having a memory management unit with at least two modes of operation, one mode of operation being a normal mode of operation and a second mode of operation being a default mode of operation, the data processor having two privilege modes wherein the two privileged modes provide data protection, the data processor comprising:

circuitry within the data processor for providing to the memory management unit a logical address;

a first transparent translation register, within the memory management unit;

a second transparent translation register, within the memory management unit;

compare circuitry for receiving the logical address, the compare circuitry coupled to both the first transparent translation register and the second transparent translation register, the compare circuitry comparing a predetermined number of bits in the logical address to a predetermined number of bits in each of the first and second transparent translation register and asserting a control signal if the predetermined number of bits in the logical address equal the predetermined number of bits in one of the first and second transparent translation register, the compare circuitry functioning in the default mode of operation;

a default storage location, within the memory management unit, for storing a plurality of attribute bits used to provide write access information for data protection, the default storage location having an output for providing the plurality of attribute bits regardless of the privilege mode; and a selector circuit having a first input for receiving a predetermined number of attribute bits from the first transparent translation register used to provide write access information for data protection, having a second input for receiving a predetermined number of attribute bits from the second transparent translation register used to provide write access information for data protection, and having a third input coupled to the output of the default storage location, the selector circuit being coupled to the control signal wherein the control signal is used to determine an output of the selector circuit wherein the output of the selector circuit is the bits of one of either the first input, the second input, or the third input, the selector circuit functioning in the default mode of operation.

2. The data processor of claim 1 wherein the data processor is coupled to a plurality of memory locations and the default storage location has a bit for controlling write access permissions to the plurality of memory locations.

3. The data processor of claim 1 wherein the data processor is coupled to a plurality of memory locations and the plurality of attribute bits within the default storage location comprise at least one write access permission bit, at least one cache mode bit, and at least one user page attribute bit.

4. The data processor of claim 1 wherein the two privileged modes comprise a first mode wherein all instructions of the data processor may be executed and allows access to all control registers and general registers within the data processor, and a second mode wherein the second mode is more restricted in terms of instructions available for execution than the first mode.

5. The data processor of claim 1 wherein the default storage location has an input which may be used to alter at least one bit stored within the default storage location.

6. The data processor of claim 1 wherein the compare circuitry asserts a plurality of control signals if the predetermined number of bits in the logical address equal the predetermined number of bits in one of the first and second transparent translation register.

7. The data processor of claim 1 wherein the circuitry within the data processor for providing to the memory management unit a logical address, the first transparent translation register, the second transparent translation register, and the selector circuit are used to process logical addresses of operands within the data processor system.

8. The data processor of claim 7 wherein the default storage location is coupled to circuitry for providing memory access control in a data processing system wherein the circuitry for providing memory access control receives, as an input, logical addresses corresponding to processor instructions within the data processing system.

9. The data processor of claim 1 wherein the circuitry within the data processor for providing to the memory management unit a logical address, the first transparent translation register, the second transparent translation register, and the selector circuit are used to process logical addresses of processor instructions within the data processor system.

10. The data processor of claim 9 wherein the default storage location is coupled to circuitry for providing memory access control in a data processing system wherein the circuitry for providing memory access control receives, as an input, logical addresses corresponding to operands within the data processing system.

11. The data processor of claim 1 wherein the first transparent translation register has priority over the second transparent translation register wherein if the compare circuitry determines that the predetermined number of bits in the logical address equal the predetermined number of bits in the first transparent translation register, then data in the second transparent data register is not accessed.

12. The data processor of claim 1 wherein the first transparent translation register has a mask field wherein the mask field is used by mask circuitry to reduce the quantity of the predetermined number of bits in the first transparent translation register used by the compare circuit.

13. The data processor of claim 1 wherein both the first and second transparent translation register have a mask field wherein the mask field is used by mask circuitry to reduce the quantity of the predetermined number of bits in both the first and second transparent translation register used by the compare circuit.

* * * * *